(No Model.)

M. CARMAN.
TOOL HANDLE FASTENER.

No. 510,326. Patented Dec. 5, 1893.

Witnesses.
Robert Everett
G. W. Rea.

Inventor.
Michael Carman.
By
James L. Norris.
Atty

UNITED STATES PATENT OFFICE.

MICHAEL CARMAN, OF O'NEAL, SOUTH CAROLINA.

TOOL-HANDLE FASTENER.

SPECIFICATION forming part of Letters Patent No. 510,326, dated December 5, 1893.

Application filed April 29, 1893. Serial No. 472,335. (No model.)

*To all whom it may concern:*

Be it known that I, MICHAEL CARMAN, a citizen of the United States, residing at O'Neal, in the county of Greenville and State of South Carolina, have invented new and useful Improvements in Tool-Handle Fasteners, of which the following is a specification.

This invention relates to devices for fastening handles to tools, and has for its object to provide a simple and reliable fastening that will hold the tool securely in its socket or handle, without liability of turning or twisting therein and which will allow the tool to be quickly detached and replaced or interchanged with another, or be attached to another handle, whenever required; so that in case of breakage or injury to either the tool or its handle the other part need not be thrown aside or lost.

My invention consists in the construction and combination of parts in a tool fastening device, as hereinafter described and claimed.

Figure 1:
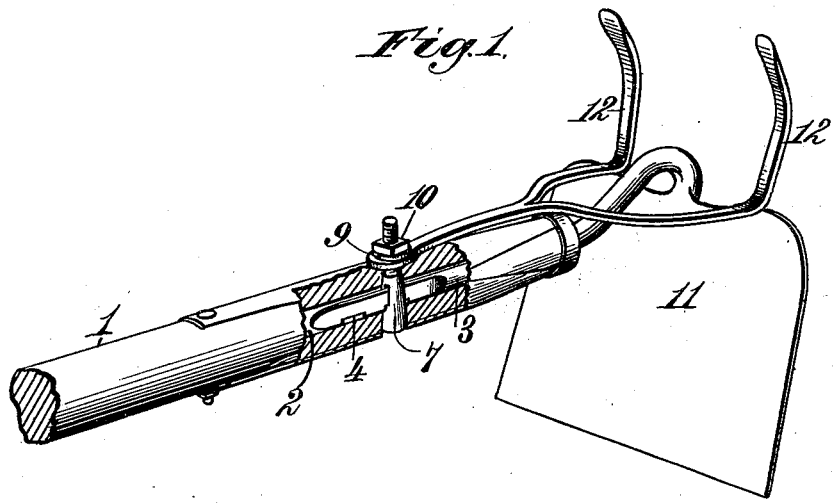
Figure 2:
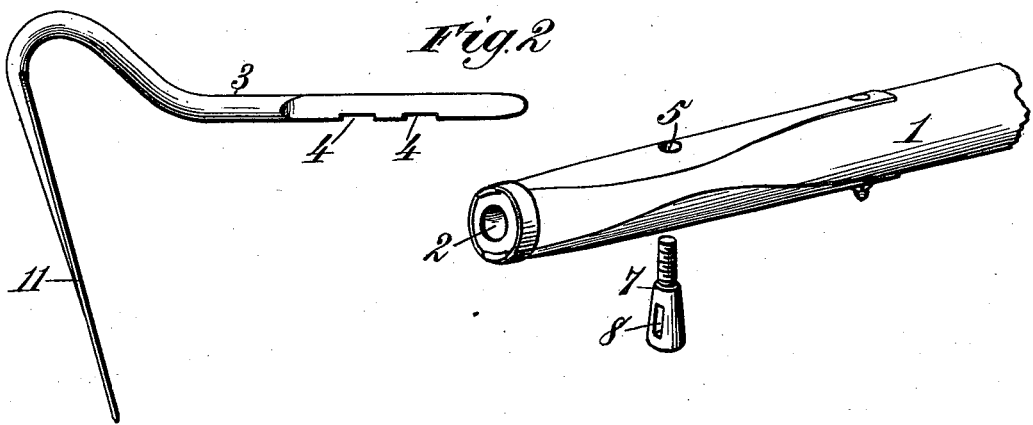
Figure 3:
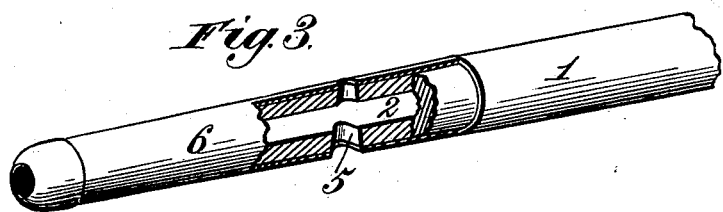

In the annexed drawings, illustrating the invention—Figure 1 is a view of a garden tool with a portion of its handle in section to show the arrangement of the fastening device. Fig. 2 is a view of the tool, the handle and the fastening devices disconnected. Fig. 3 is a view of a ferrule that may be secured to the tool handle.

The end of the tool handle 1 is provided with a socket 2 adapted to receive the shank or tang 3 of the tool. One edge of the tool shank or tang 3 is provided with a recess or a series of recesses 4, as shown. Through the socket 2 is extended transversely a bolt hole 5, which may be slightly tapering, if preferred. The socket 2 and bolt hole 5 may be formed partly in the tool handle and partly in a long ferrule 6 by which the end of the handle may be braced.

Before the shank or tang 3 of the tool is attached to the handle 1, a screw bolt 7 provided with a conical head having a transverse slot 8 is inserted into and through the bolt hole 5 in such position that the bolt slot 8 will be in line with the tool socket. The shank or tang 3 is then inserted into the socket 2 and passed back through the bolt slot 8 a sufficient distance to permit one of the recesses 4 to be engaged with the end of the bolt slot nearest the head of the bolt. A washer 9, and a nut 10, are then placed on the threaded end of the screw bolt, so that by turning down the nut tightly against the handle, 1, or its ferrule 6, the conical slotted head of the screw bolt 7, will be seated firmly and securely in the conical bolt hole 5 and will be drawn into such close engagement with one of the recesses 4 of the tool shank or tang 3, as to effectually prevent the tool from turning in its socket or becoming loosened and detached from the handle, while the conical form of the head of the bolt enables the latter to be very tightly secured in position in the transverse bolt-head 5, so that rattling or movement of the parts is avoided. By providing the tool shank or tang 3 with a series of recesses 4, the tool may be adjusted in or out as desired, or be adapted to sockets of varying length. If preferred, however, only one recess 4 may be provided.

While I have shown the fastening device as applied to the shank or tang of a hoe, it is obvious that it is as well adapted to the shanks or tangs of various other tools and implements. Besides attaching a hoe 11 to its handle, the bolt 7 and nut 10 may also serve to secure in place a rake head or forked tool, 12, that may be braced against the back of the hoe blade.

The slotted screw bolt 7, in connection with the recessed tang 3, serves as an effectual, economical and easily applied means for detachably connecting various kinds of tools to their handles, in such a manner that they may be quickly connected and disconnected as required, so as to render the tool capable of being employed with different handles, and permit the replacement of either part when broken or injured without throwing away, or losing the use of, the entire implement.

What I claim as my invention is—

1. The combination of a handle having a longitudinal socket and a transverse bolt-hole intersecting said socket, a screw-bolt passing through the said bolt-hole and having a slot coincident with the longitudinal socket in the handle, a tool having a shank or tang extending longitudinally into the handle socket and through the slot in the screw-bolt and provided in one edge with a recess which engages the edge of the slot in the screw-bolt, and a nut to draw said bolt transversely through the bolt-hole in the handle, substantially as and for the purposes described.

2. The combination of a handle having a longitudinal socket and a transverse conical bolt-hole intersecting said socket, a screw-bolt passing through said bolt-hole and having a conical head provided with a transverse slot coinciding with the longitudinal socket in the handle, a tool having a shank or tang extending longitudinally into the handle socket and through the slot in the conical head of the bolt and provided in one edge with a recess which engages said bolt, and a nut for drawing the bolt transversely in the bolt-hole in the handle socket, substantially as and for purposes described.

In testimony whereof I have hereunto set my hand and affixed my seal in presence of two subscribing witnesses.

MICHAEL CARMAN. [L. S.]

Witnesses:
J. TUPPER HENESEY,
D. C. HENSON.